US006557841B2

(12) United States Patent
Dellach et al.

(10) Patent No.: US 6,557,841 B2
(45) Date of Patent: May 6, 2003

(54) OVER-CENTER POWER CLAMP TOGGLE MECHANISM

(75) Inventors: Jeffery Dellach, Macomb, MI (US); Timothy Wheeler, Shelby Twp., MI (US)

(73) Assignee: Norgren Automotive, Inc., DE (US)

( * ) Notice: Subject to any disclaimer, the term of this patent is extended or adjusted under 35 U.S.C. 154(b) by 0 days.

(21) Appl. No.: 09/891,916

(22) Filed: Jun. 26, 2001

(65) Prior Publication Data

US 2002/0195761 A1 Dec. 26, 2002

(51) Int. Cl.[7] .................................................. B23G 2/38

(52) U.S. Cl. ......................... 269/32; 269/228; 269/237; 269/222; 269/233

(58) Field of Search .......................... 269/32, 228, 237, 269/222, 233, 24, 27, 216, 217, 220, 221, 225.6, 93, 94, 238; 74/55, 25, 105, 106

(56) References Cited

U.S. PATENT DOCUMENTS

| | | | | |
|---|---|---|---|---|
| 3,347,542 A | | 10/1967 | Mericle, Jr. | |
| 3,724,837 A | * | 4/1973 | McPherson | 269/32 |
| 4,396,183 A | | 8/1983 | Lymburner | |
| 4,458,889 A | * | 7/1984 | McPherson | 269/32 |
| 4,723,767 A | * | 2/1988 | McPherson | 269/32 |
| 4,921,233 A | | 5/1990 | Fabrice | |
| 5,575,462 A | * | 11/1996 | Blatt | 269/32 |
| 5,595,375 A | * | 1/1997 | Bennhausen | 269/32 |
| 5,816,567 A | * | 10/1998 | Horn | 269/32 |
| 5,884,903 A | | 3/1999 | Sawdon | |
| 5,996,984 A | * | 12/1999 | Takahashi | 269/32 |
| 6,076,816 A | * | 6/2000 | Tunkers | 269/32 |
| 6,338,476 B1 | * | 1/2002 | Takahashi | 269/32 |
| 6,354,580 B1 | * | 3/2002 | Nagai | 269/225 |

* cited by examiner

*Primary Examiner*—Joseph J. Hail, III
*Assistant Examiner*—Daniel Shanley
(74) *Attorney, Agent, or Firm*—Young & Basile, P.C.

(57) ABSTRACT

A rotary clamp having a linkage assembly that provides an over-center condition for providing high actuation and clamping forces without excessively wearing the components of the linkage assembly. The linkage assembly is connected to a linear actuator for converting linear actuator motion into rotary clamp motion between a clamped position and an unclamped position. The linkage assembly provides a first link having an aperture for receiving a pin and a roller wherein the roller is coaxially connected o the pin. The second link is pivotally connected to the first link, and the third link is pivotally connected to the second link. The roller of the first link rollably engages a surface on the third link when moving in and out of the clamped position. A beam-like structure connected to the housing provides a wear surface wherein the pin engages the wear surface in response to the roller engaging the third link to prohibit the first link from reaching an over-center position. A spring detent is provided in the third link to engage the roller in the clamped position and resist movement of the roller from moving toward the end clamped position when power is lost to the rotary clamp.

19 Claims, 8 Drawing Sheets

OVER-CENTER POWER CLAMP TOGGLE MECHANISM

FIELD OF THE INVENTION

The present invention relates, in general, to rotary clamps for linear actuators, and, more particularly, to a rotary clamp having a linkage assembly that provides an over-center condition for providing high actuation and clamping forces without excessively wearing the components of the linkage assembly.

BACKGROUND OF THE INVENTION

Rotary clamps are known of the type in which linear actuator reciprocating movement is adapted to be translated into angular rotary movement of a clamp arm. The linear actuator may be powered by a fluid motor, and an additional linkage or other transmitting means converts the linear actuator motion into rotary clamp motion. Normally, when the fluid motor is in a retracted position, the clamp is in a released position, that is, the clamp arm is removed from the work supporting surface. When the fluid motor is an extended position, the clamp arm is pivotally moved into a clamping position to clamp a workpiece to a work supporting surface and hold and/or locate the workpiece against the work supporting surface.

Various guide and linkage means have been proposed to correctly translate linear reciprocating movement of a piston and piston rod, utilized in the linear actuator, to correctly swing the clamp arm into or out of clamping position and obtain the highest mechanical advantage which can be utilized within the power stroke of the linear actuator. All of these known mechanisms, more or less, include complex designs of various mechanical components at high manufacturing and assembly costs.

A known design powers a linear actuator along a guide slot provided in a housing of the clamp. The linear actuator is pivotally connected to a linkage assembly which in turn is pivotally connected to a lever arm of a shaft link. The linear actuator provides reciprocal linear movement along the guide slot, thus driving the linkage assembly which converts the linear movement of the linear actuator into rotational movement of the shaft link. A clamp arm is connected to the shaft link wherein the shaft link provides rotary motion to the clamp arm between a clamped position and an unclamped position.

Typically, such designs try to prevent the overtravel of the linkage member to an over-center position wherein the pivot points of the linkage member are at a 0° angle with respect to one another, in other words, the longitudinal axis of the linkage member is at a position perpendicular to the longitudinal axis of the guide slot. As the linkage angle approaches 0°, the linkage force approaches infinity through the relationship $P=F\div(\text{tangent } \alpha)$ where P equals the linkage force, F equals the linear actuator force, and $\alpha$ equals the linkage angle. As the linkage member approaches the over-center position, the clamp mechanism experiences ultra high linkage forces which may cause premature wearing of the linkage mechanism or may cause the linkage mechanism to "freeze" or "lock up".

Other designs provide for the linkage mechanism to travel to a positive center or slight over-center locking position wherein needle bearings are utilized so that the cylinder pressure required to release the clamp is no greater than the cylinder pressure needed to actuate the clamp to the locking position. Such configurations are capable of producing high clamping forces, but they are also subject to undesirable wear to the internal mechanism created during the passage through the ultra-high force over-center position. The result of the wear is the reduction of the clamp forces in which the clamp can produce.

Thus, it would be desirable to provide a rotary clamp that provided a linkage member that could travel to an over-center position without experiencing the excessive wear that is common of rotary clamps which utilize over-center linkage members.

SUMMARY OF THE INVENTION

The present invention overcomes the above-noted shortcomings by providing a rotary clamp that provides for an over-center linkage position without experiencing excessive wear to the rotary clamp. The rotary clamp of the present invention provides a means for converting linear actuator motion between a first position and a second position into rotary clamp motion between an unclamped position and a clamped position, respectively. The present invention also provides a means for preventing a first link of the converting means from reaching an over-center position and allowing a second link of the converting means to reach an over-center position in the clamped position thereby creating higher clamping and actuating forces without causing wear to the clamp. A means for resisting movement of the converting means from said clamped position toward said unclamped position is also provided.

The converting means provides a linkage assembly connected to a linear actuator and a clamp arm. The linkage assembly includes a first link pivotally connected to a second link, and a third link pivotally connected to the second link.

The preventing means provides a pin received by an aperture provided in the first link of the linkage assembly wherein a roller is coaxially connected to the pin. The roller engages the third link of the linkage assembly when moving in and out of the clamped position, and the pin engages a wear surface in response to the roller engaging the third link to prohibit the first link from reaching the over-center position.

The resisting means provides a spring detent for engaging the roller and resisting movement of the rotary clamp from the clamped position to the unclamped position.

BRIEF DESCRIPTION OF THE DRAWINGS

In the drawings, like reference numerals refer to similar elements throughout the various views.

DESCRIPTION OF THE PREFERRED EMBODIMENT

Figure 1:
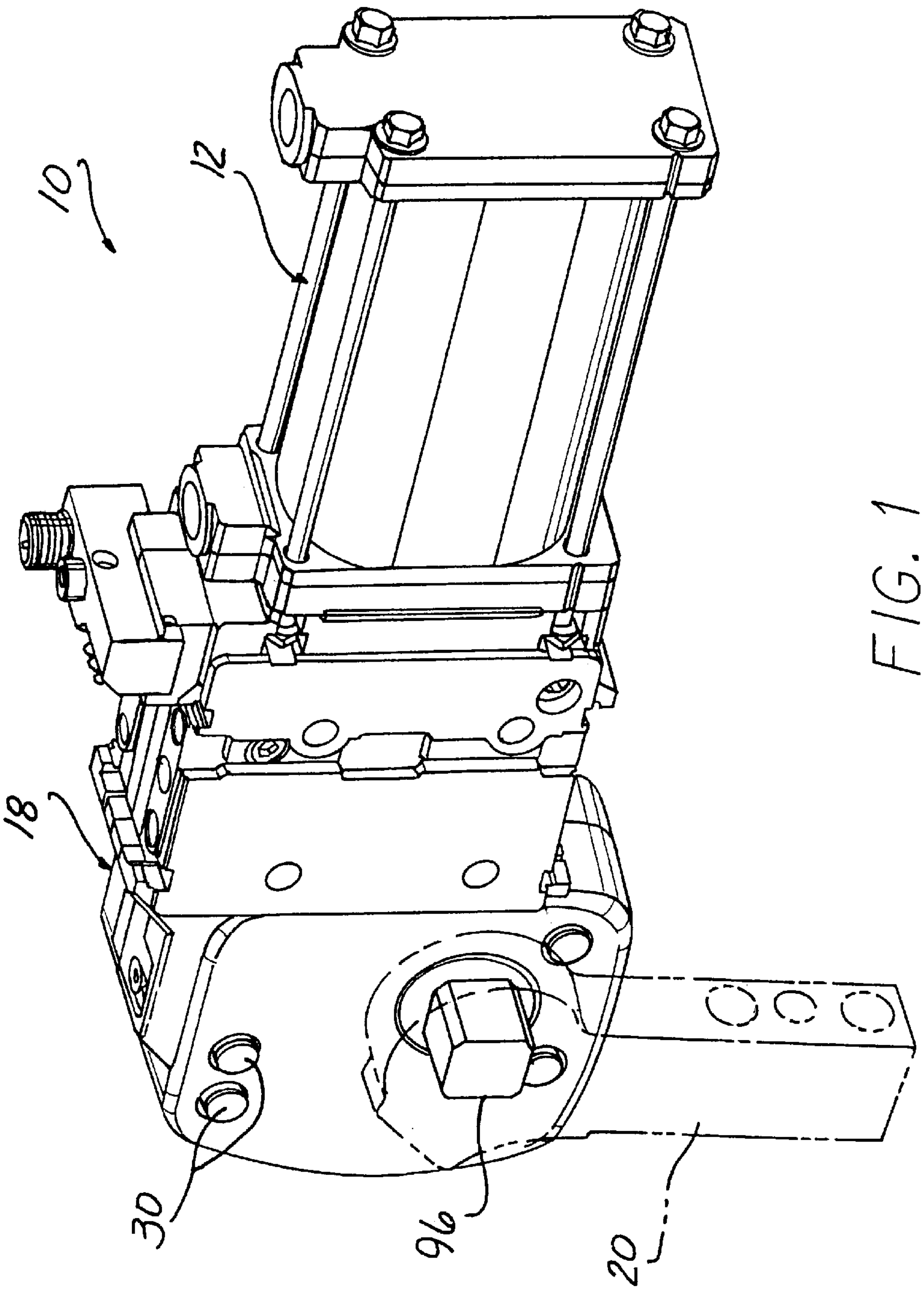
FIG. 1 is a perspective view of a rotary clamp of the present invention.
Figure 2:
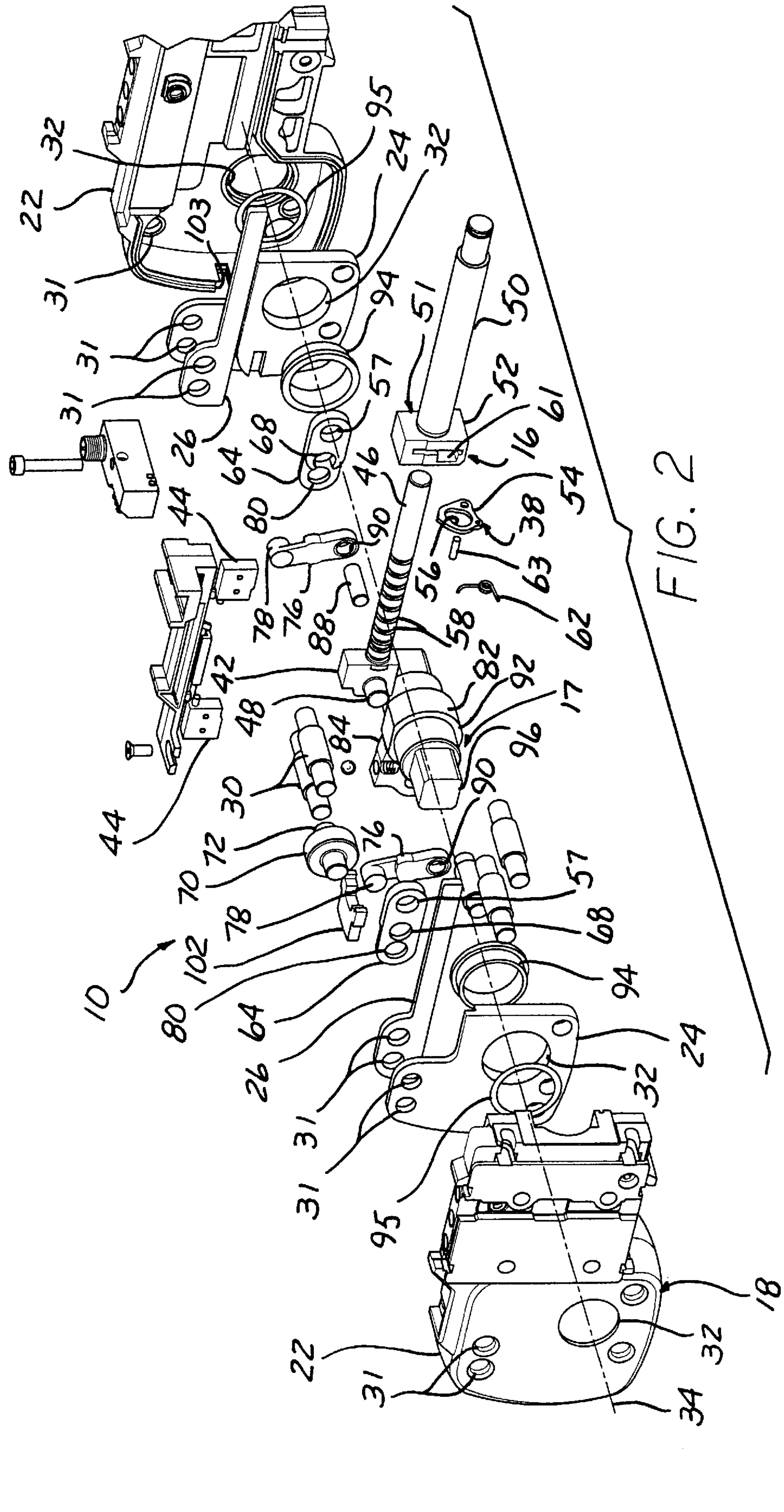
FIG. 2 is an exploded perspective view of the rotary clamp of the present invention.
Figure 3:
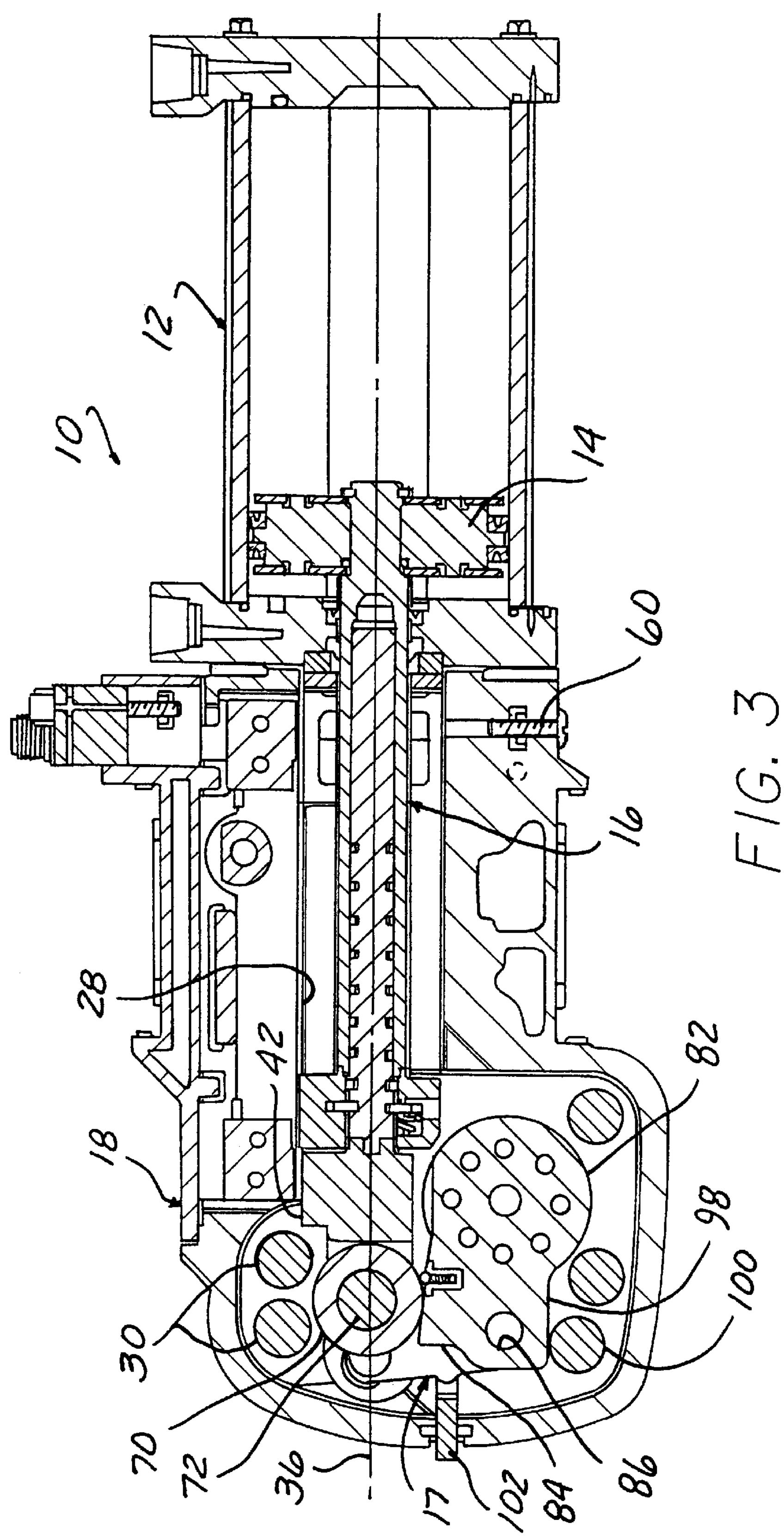
FIG. 3 is a sectional view of the rotary clamp of the present invention.

Referring to the drawings, the present invention will now be described in detail with reference to the preferred embodiment.

FIGS. 1–8 illustrate a rotary clamp 10 as defined by the present invention. The rotary clamp 10 is actuated by a fluid cylinder or linear actuator 12 having a piston 14 therein. The piston 14 is connected to a piston rod 16 which extends outwardly from the linear actuator 12 and is received by a housing 18 of the rotary clamp 10. The linear actuator 12 is preferably pneumatic, but the linear actuator 12 may also be hydraulic. The linear actuator 12 provides linear reciprocating movement between a first position and a second position to the piston rod 16. A means for converting the linear actuator motion between the first position and the second position to a rotary clamp motion between a clamped position and unclamped position, respectively, is connected to the piston rod 16. The converting means transfers the rotary clamp motion to a clamp arm 20 mounted outside and adjacent the housing 18.

The housing 18 of the rotary clamp 10 is attached to one end of the linear actuator 12 and is formed by two halves 22 of the housing 18. The two halves 22 of the housing 18 form a hollow portion for housing a pair of opposing plate-like structures 24. The plate-like structures 24 are fabricated from a high strength metallic material so as to support the clamping forces transmitted through the rotary clamp 10. The plate-like structures 24 combine with a pair of beam-like structures 26 to form an elongated guide slot 28 that extends longitudinally through the housing 18 of the rotary clamp 10.

The two halves 22 of the housing 18, the plate-like structures 24, and the beam-like structures 26 are connected by dowel pins 30 that are press-fit through apertures 31 provided in the corresponding structures. The one end of the housing 18 adjacent the linear actuator 12 is open to receive the free end of the piston rod 16. The housing 18 also includes a series of coaxial apertures 32 which extend through the two halves 22 of the housing 18 and through the plate-like structures 24 of the housing 18. These coaxial apertures 32 have a common axis 34 offset from and substantially perpendicular to a longitudinal axis 36 of the guide slots 28.

To adjust the amount of rotation of the clamp arm 20 without having to disassemble the rotary clamp 10, an adjustable piston rod assembly 38 provides for linear telescopic adjustment of the piston rod 16 along its longitudinal axis. The adjustable piston rod assembly 38 is the subject of a separate patent application under a common assignee, and because the adjustable piston rod assembly 38 is not a necessary feature of the present invention, the adjustable piston rod assembly 38 will not be discussed in detail here. However, the necessary features of the adjustable piston rod assembly 38 for the present invention are that the adjustable piston rod assembly 38 provides an adjustable telescopic piston rod 16 and a rod end 42. The adjustable telescopic piston rod 16 provides a solid rod 46 that is telescopically received by a hollow shaft 50. An adjustment mechanism 51 is connected to the end of the hollow shaft 50 and allows for telescopic adjustment of the rod 46 within the hollow shaft 50. The adjustment mechanism 51 provides a small housing or block 52 which houses a spring biased cam 54. The cam 54 provides a through aperture 56 for receiving the rod 46. The rod 46 provides a plurality of cylindrical recesses 58 for receiving a portion of the cam 54 that defines a smaller radius portion of the aperture 56 in the cam 54. The cam 54 is accessed from outside the housing 18 of the rotary clamp 10 through an aperture 60 provided in the housing 52 of the rotary clamp 10 and an aperture 61 provided in the block 52 of the adjustment mechanism 51. The cam 54 pivots about pin 63, and upon applying a force against the cam 54, the cam 54 will yield against the bias of spring 62 to allow rod 46 to pass through a larger radius portion of aperture 56. The rod 46 may then be telescopically moved relative to the hollow shaft 50. When the force against the cam 54 is released, the portion of the cam 54 that defines the smaller radius portion of aperture 56 engages one of the cylindrical recesses 58 of rod 46 to lock the telescopic piston rod 16 into a fixed position.

To connect the piston rod 16 to the converting means, the rod end 42 is connected to the end of rod 46 of the telescopic piston rod 16. The rod end 42 provides a pin 48 which extends through the lateral sides of the rod end 42. The rod end 42 has a flat top surface which is sensed by a pair of proximity switches 44. The proximity switches 44 send a signal to a controller (not shown) to electronically identify when the rotary clamp 10 is in the clamped or unclamped position. The converting means provides a linkage assembly 17 having a pair of first links 64, a pair of second links 76, and a third link 82. The first links or linkage members 64 are substantially parallel and oval and have three corresponding apertures 57, 68, 80 extending therethrough. The first aperture 57 pivotally receives the ends of pins 48 wherein the ends of pin 48 are received by and slide along the elongated guide slot 28.

The second aperture 68 of linkage members 64 pivotally receives the ends of a pin 72 which is mounted within a roller 70. The roller 70 includes an aperture for receiving pin 72 such that pin 72 is coaxially mounted along the centerline axis of roller 70. The second aperture 68 in the linkage members 64 is substantially oblong or oval so that when the roller 70 engages the linkage assembly 17, as will be described in detail later, the pin 72 may move within the second apertures 68 thus allowing the roller 70 to move relative to the linkage member 64. Roller bearings (not shown) may be utilized between pin 72 and the second aperture 68 of linkage members 64 to enhance the rolling of roller 70. The ends of pin 72 are received by and slide along the elongated guide slot 28 created by the plate-like structure 24 and the beam-like structure 26.

The linkage members 64 are pivotally connected to the second links or toggle links 76 by the third aperture 80 of linkage members 64 pivotally receiving an integral post 78 from the toggle links 76. The toggle links 76 are substantially oval and directly oppose one another. Each post 78 of the toggle links 76 is substantially cylindrical and extends outward from one end of the links 76. At the opposite end of toggle links 76, the links 76 are pivotally connected to a shaft link or third link 82. The shaft link 82 includes an integral lever arm 84 having an aperture 86 extending therethrough. Coaxial apertures 90 provided in toggle links 76 are aligned with the through aperture 86 in the lever arm 84 of the shaft link 82, and a pin 88 is inserted therethrough such that the toggle links 76 are pivotally mounted on opposite sides of the lever arm 84.

To transmit rotary motion to the clamp arm 20, the shaft link 82 includes a pivot pin 92 that is integrally connected to the lever arm 84. The pivot pin 92 is substantially cylindrical and is rotatably disposed within the coaxial apertures 32 provided in the housing 18 of the rotary clamp 10. A pair of bushings 94 are seated within the coaxial apertures 32 in the housing 18 to act as a bearing surface for pivot pin 92. O-rings 95 are utilized to seal the bushings 94 to the housing 18. A substantially rectangular portion 96 of the pivot pin 92 extends through the coaxial apertures 32 and away from the housing 18 to allow the clamp arm 20 to be mounted thereto. Alternatively, the end portion of the pivot pin 92 may be substantially cylindrical as seen in the alternative embodiment shown in FIGS. 3, 4A and B. In this alternative embodiment, the clamp arm 20 is fastened to the cylindrical pivot pin 92 through a plurality of fasteners.

In order to stop the clamp arm 20 in a predetermined position, the shaft link 82 provides a positive stop 98 integral with and extending from the lever arm 84. The positive stop 98 engages a post 100 that is secured between the interior walls of the housing 18. Preferably, positive stop 98 has a substantially flat surface that engages post 100, but the positive stop 98 may also be formed as an arcuate surface therein to complement and receive the substantially circular shape of the post 100. The positive stop 98 abuts the post 100 to limit the travel of the clamp arm 20 in the clamped position.

Even though the rotary clamp 10 is designed not to open unexpectedly upon the loss of power and/or air pressure to the linear actuator 12, it may be desirable to move the rotary clamp 10 to the unclamped position in order to release a workpiece (not shown) or reset the linkage assembly 17. Due to the position of the linkage assembly 17 when in the clamped position, the actuation force may be too great to manually move the rotary clamp 10 to the unclamped position without disassembling the rotary clamp 10 or the linear actuator 12. The present invention provides a reciprocal member 102 that is slidably disposed within a slot 103 provided in the end wall of the housing 18. The reciprocal member 102 has a substantially rectangular body with a pair of larger end portions extending within the housing 18 and beyond the length of the slot 103 so as to capture the reciprocal member 102 within the end wall of the housing 18. The reciprocal member 102 is aligned with the mid-portion of links 76 so that the reciprocal member 102 is displaced by the links 76 when the rotary clamp 10 is in the clamped position. If power and/or air is lost to the rotary clamp 10 when in the clamped position, the reciprocal member 102 may be manually pushed to move the linkage assembly 17 toward the unclamped position.

Figure 6:
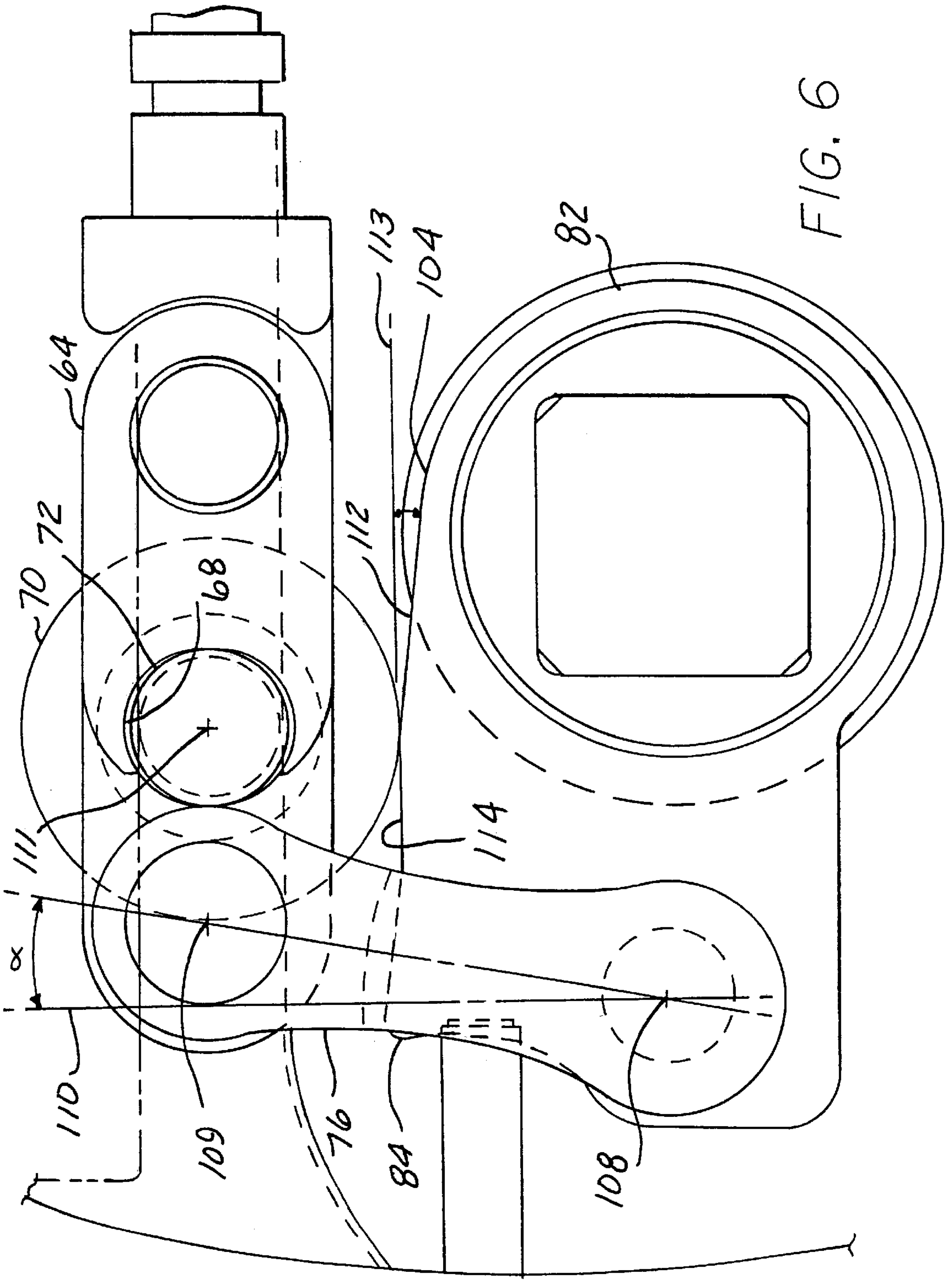
FIG. 6 is a schematic view showing the roller engaging the first portion of the inclined surface on the shaft link.
Figure 7:
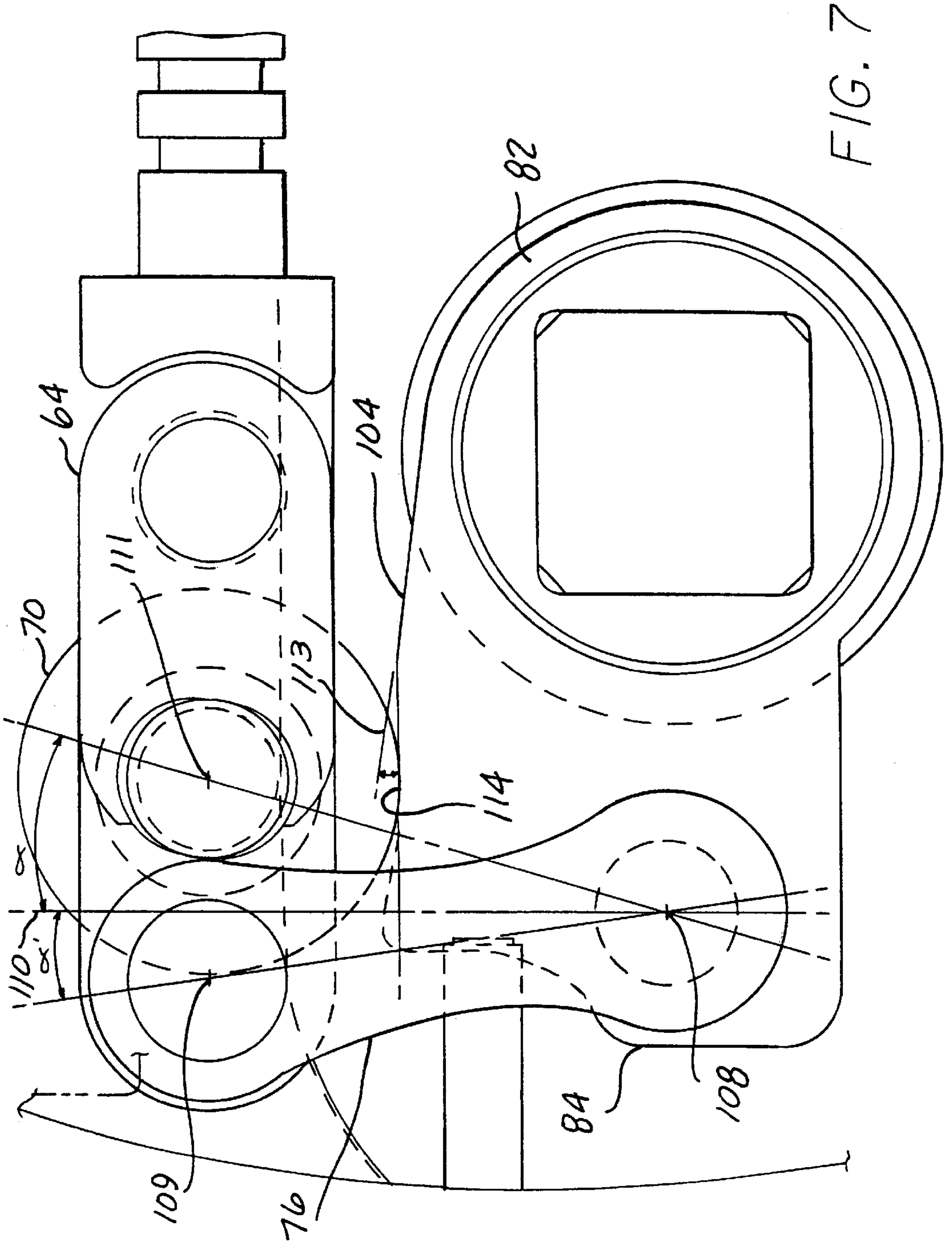
FIG. 7 is a schematic view showing the roller engaging the second portion of the inclined surface of the shaft link.
Figure 8:
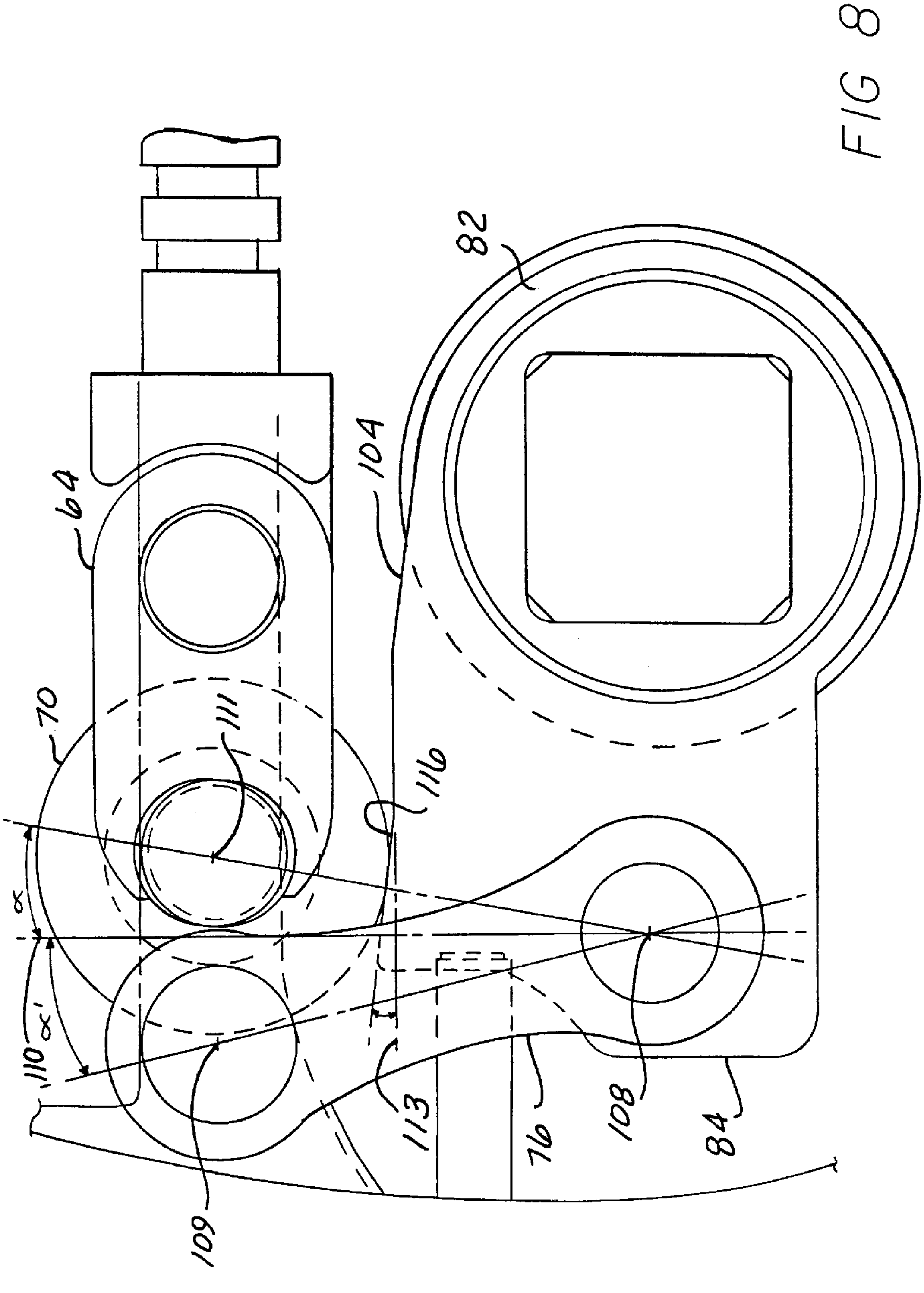
FIG. 8 is a schematic view showing the roller engaging the third portion of the inclined surface of the shaft link.

To allow the linkage assembly 17 to move to an over-center position without risking wear to the rotary clamp 10, the present invention provides a means for preventing the first link 64 of the linkage assembly 17 from reaching an over-center position while allowing the second link 76 of the linkage assembly 17 to reach an over-center position when in the clamped position. This occurs by having pin 72 engage a substantially flat wear surface of the beam-like structure 26 which further defines a portion of the elongated slot 28. Although not shown, the pin 72 may provide a flat surface to enhance the engagement with the wear surface of the beam-like structure. Further upward pressure is applied to the pin 72 against the beam-like structure 26 by having the roller 70 roll onto an inclined surface 104 provided on the lever arm 84 of the shaft link 82. As seen in FIGS. 6–8, the aperture 68 in the linkage members 64 that receive pin 72 of the roller 70 are oblong so that the roller 70 can adjust to the angle of the inclined surface 104 while allowing the pin 72 to maintain its linear path along the elongated guide slot 28. The inclined surface 104 provides a ramp by which the roller 70 may engage and roll onto when the rotary clamp 10 is moving in and out of the clamped position. The inclined surface 104 is formed such that as the landing 104 moves away from the pivot pin 92 and toward the lever arm 84, the landing 104 rises 5° to 6° relative to a horizontal axis 113, as indicated by 112 in FIG. 6. The landing 104 then transforms to a slightly downward portion 114 that extends at a −1° angle relative to the horizontal axis 113, as seen in FIG. 7. As the landing 104 moves toward the end of the lever arm 84, the landing 104 begins to rise again at a 7° angle relative to the horizontal axis 113, as shown by 116 in FIG. 8. The last raised portion 116 of the inclined surface 104 assures that the piston rod 16 will wedge the roller 70 between the inclined surface 104 and the wear surface of the beam-like structure 26 by driving the pin 72 into the beam-like structure 26 and rolling the roller 70 up the inclined surface 104 to provide the clamp 10 with a tight fit in the clamped position. Although not shown in the drawings, the landing 104 may also provide an additional raised portion of a 15° to 16° angle relative to the horizontal axis 113 at the end of the lever arm 84 to assure that the roller 70 will wedge the pin 72 into the wear surface of the beam-like structure 26 regardless of the wear on the roller 70. The different angles on the inclined surface 104 assure that rotary clamp 10 will not become unclamped when the clamp 10 is backdriven. If the rotary clamp 10 is backdriven, such as in the case of loss of power and/or air or an attempt to manually open the clamp 10, the roller 70 may "relax" or roll down section 116 of the inclined surface 104 and stop and hold at section 114. The upward angle of section 114, in combination with the angles of the linkage assembly 17, creates actuation forces that prohibit the clamp 10 from moving toward the unclamped position.

A means for resisting movement of the linkage assembly 17 is provided within the rotary clamp 10 to ensure that the roller 70 does not roll toward the unclamped position when power is lost to the rotary clamp 10. Preferably, the means for resisting movement provides a back lock plunger 118 having a spring detent therein, as most clearly shown in FIG. 4A. The back lock plunger 118 has an open-ended cylindrical body 120 disposed within an aperture provided in the downwardly declining portion 114 of the inclined surface 104 of the lever arm 84 of the shaft link 82. The cylindrical body 120 has a compression spring 122 and a spherical ball or roller 124 disposed therein. The spherical roller 124 is partially disposed within the cylindrical body 120 as the compression spring 122 biases the spherical roller 124 toward the open end of the cylindrical body 120. A lip or shoulder on the end of the cylindrical body 120 captures and holds the spherical roller 124 within the body 120. The spherical roller 124 extends just above the inclined surface 114 of the lever arm 84 of the shaft link 82 to provide a bias against the roller 70 from moving toward the unclamped position. When enough force is applied to the roller 70, the spherical roller 124 will yield to the compression spring 122 by receding within the cylindrical body 120 thereby allowing the roller 70 to pass over the back-lock plunger 118.

Figure 4B:
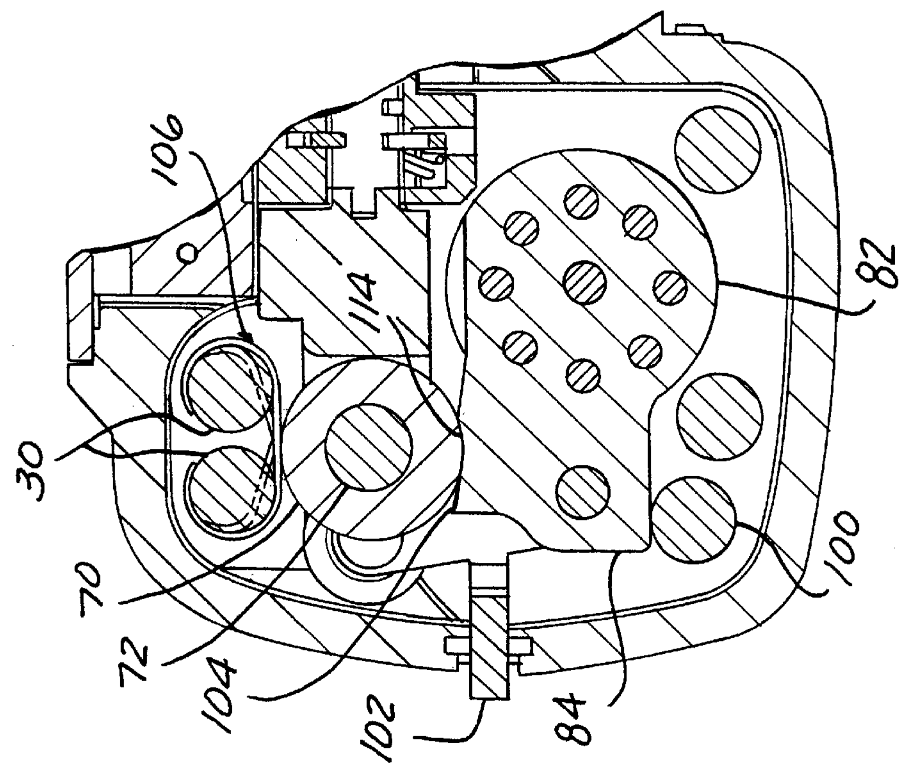
FIG. 4B is a broken sectional view of an alternative embodiment of the spring detent of the present invention.
Figure 4A:
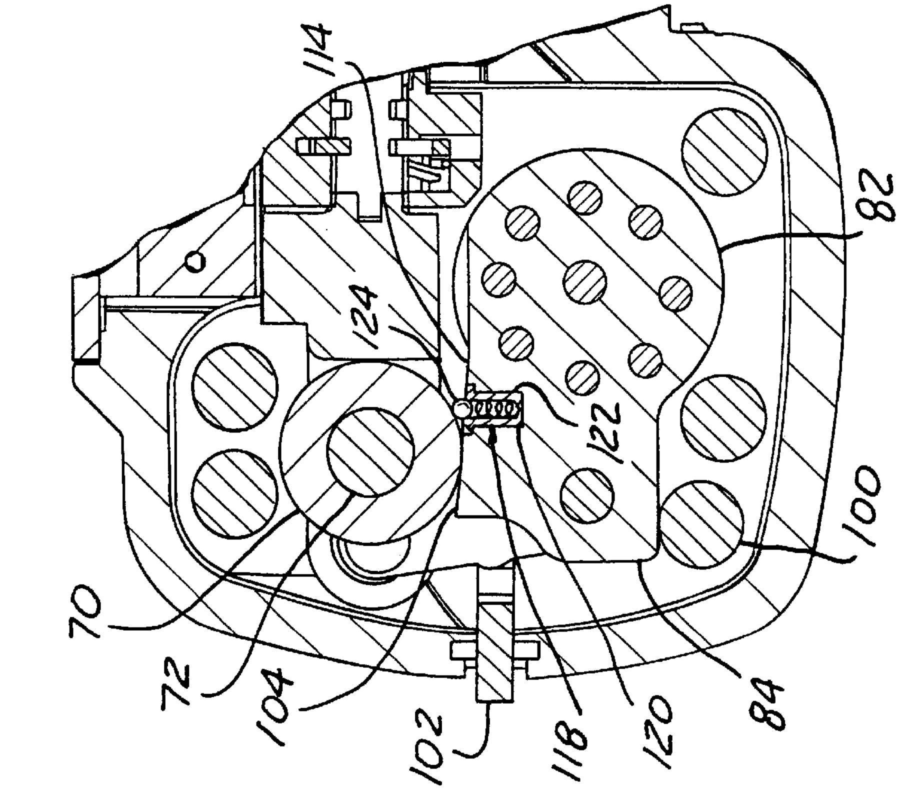
FIG. 4A is a broken sectional view showing the preferred embodiment of the spring detent of the present invention.
Figure 5:
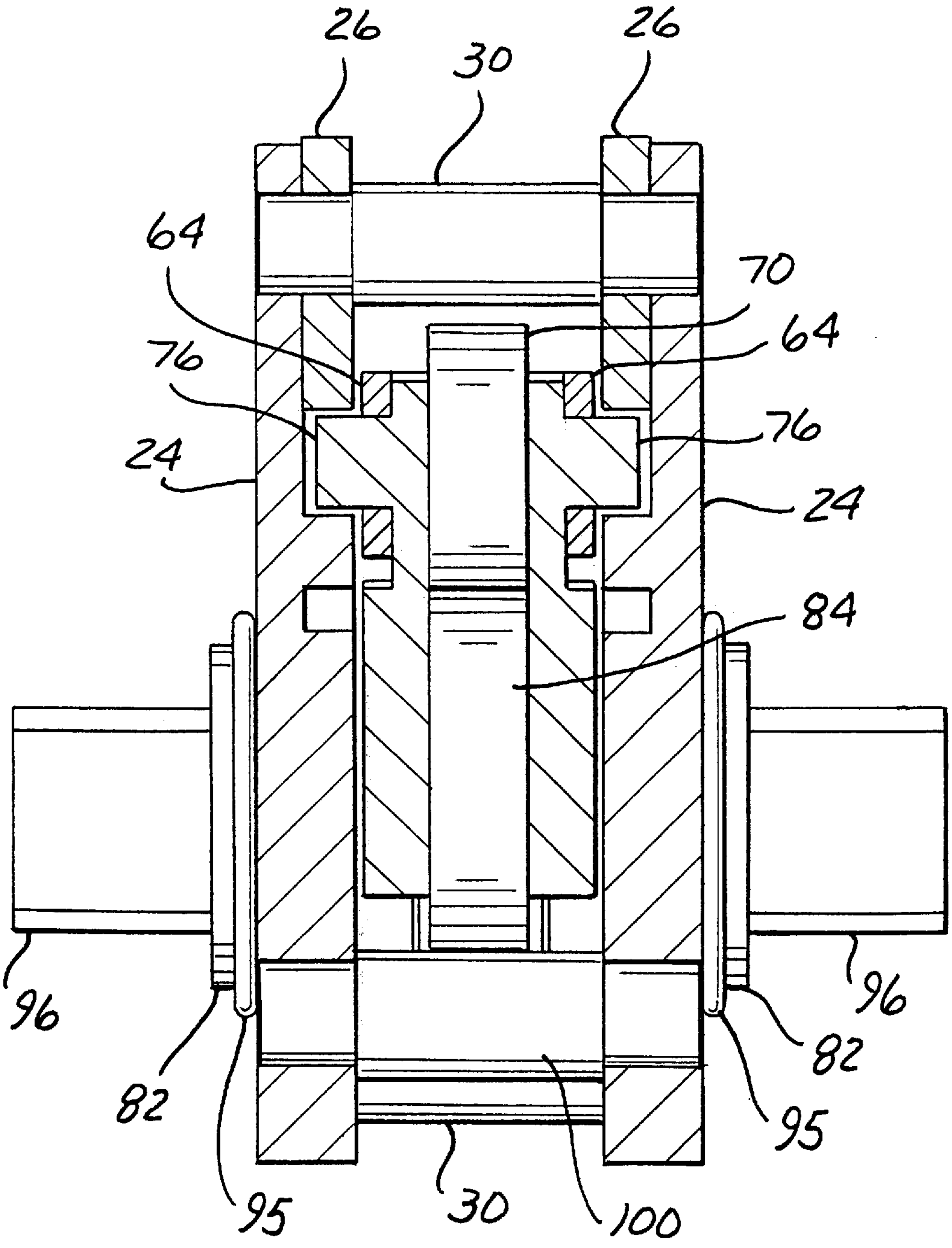
FIG. 5 is a sectional view of the preferred embodiment of the present invention.

In an alternative embodiment, the means for resisting movement of the linkage assembly provides a spring roller guide 106 mounted to two of the dowel pins 30 utilized to connect the plates 24 and beams 26 to the housing 18 of the rotary clamp 10, as seen in FIG. 4B. The spring roller guide 106 is a thin sheet of bent metal that is connected to and extends between the two dowel pins 30. The spring roller guide 106 engages the roller 70 so as to bias the roller 70 against the tapered landing 104 of the lever arm 84 when the roller 70 engages the spring roller guide 106.

In operation, the rotary clamp 10 starts in the unclamped position with the piston rod 16 fully retracted in the linear actuator 12. When the linear actuator 12 is actuated, the piston rod 16 extends into the housing 18 of the rotary clamp 10 and drives the pins 72 along the elongated guide slot 28 of the housing 18. In doing so, the linkage assembly 17 converts the linear actuator motion of the piston rod 16 into rotary motion of the clamp arm 20 toward the clamped position. Just prior to or simultaneous with the lever arm 84 rotating and engaging the post 100, the roller 70 engages the first portion 112 of the inclined surface 104 of the lever arm 84 and begins to drive the pins 72 upward into the wear surfaces of beams 26 creating a wedging effect with the roller 70, as seen in FIG. 6. At this point, the linkage angle a is before center and is effectively made with the pivotal axes 108, 109 of links 76 and a vertical axis 110. The piston rod 16 continues to drive the roller 70 along the second and third portions 114, 116 of the inclined surface 104 of the shaft link 82, as seen in FIGS. 7–8. When the piston rod 16 is fully extended, the toggle links 76 rest in an over-center position, that is, the pivotal axis 109 extends beyond the vertical axis 110. This over-center linkage angle is identified as $\alpha'$. The over-center positioning of the toggle links 76 may occur without wear to the linkage assembly 17 because pins 72 engage the wear surface of the beam-like structure 26, and roller 70 engages the inclined surface 104 of shaft link 82 to drive pins 72 into the wear surface of the beam-like structure 26. This relieves toggle links 76 from any actuation forces, and places the actuation forces on pins 72 and roller 70. The center axis 111 of the roller 70 in relation to the pivoting axis 108 of link 76 provides an angle a that does not extend beyond the vertical axis 110. Thus, the linkage assembly 17 is allowed to obtain an over-center position without realizing the excessive force which typically leads to excessive wear in similar linkage assemblies.

While the invention has been described in connection with what is presently considered to be the most practical and preferred embodiment, it is to be understood that the invention is not to be limited to the disclosed embodiments, but to the contrary, it is intended to cover various modifications on equivalent arrangements included within the spirit and scope of the appended claims. The scope is to be accorded the broadest interpretation so as to encompass all such modifications and equivalent structures as is performed under the law.

What is claimed:

1. An over-center rotary power clamp comprising:

means, having a first link and a second link, for converting linear actuator motion between a first position and a second position into rotary clamp motion between an unclamped position and a clamped position, respectively, and said first link having a roller pivotally connected thereto about a first pivotal axis, and said first link pivotally connected to said second link about a second pivotal axis wherein said first and second pivotal axes are longitudinally spaced; and means for preventing said first pivotal axis of said first link from reaching an over-center position in said clamped position and allowing said second pivotal axis of said first link to reach an over-center position in said clamped position thereby creating higher clamping and actuation forces without causing excessive wear to said rotary clamp.

2. The over-center rotary power clamp stated in claim 1, further comprising:

means for resisting movement of said converting means from said clamped position to said unclamped position when power is lost to said rotary clamp.

3. The over-center rotary power clamp as stated in claim 1, wherein said converting means comprises:

a linkage assembly having said first link pivotally connected to said second link, and a third link pivotally connected to said second link.

4. The over-center rotary power clamp stated in claim 1, wherein said preventing means further comprises:

a pair of opposing surfaces having one of said surfaces defined by a beam structure connected to said housing and the other of said surfaces defined by a third link of said converting means wherein said roller of said first link of said converting means engages said opposing surfaces to prohibit said first pivotal axis of said first link of said converting means from reaching an over-center position when in said clamped position.

5. The over-center rotary power clamp stated in claim 2, wherein said resisting movement means comprises:

a spring detent engageable with said roller of said first link of said preventing means when said converting means is moving from said clamped position to said unclamped position.

6. An over-center rotary power clamp comprising:

a housing having a linear actuator connected thereto for providing linear motion between a first position and a second position;

a linkage assembly connected to said linear actuator for converting said linear actuator motion between said first position and said second position into rotary clamp motion between a clamped position and an unclamped position, respectively;

said linkage assembly having at least a first link and a second link, and said first link having a roller pivotally connected thereto about a first pivotal axis, and said first link pivotally connected to said second link about a second pivotal axis wherein said first and second pivotal axes are longitudinally spaced; and means for preventing said first pivotal axis of said first link from reaching an over-center position in said clamped position and for allowing said second pivotal axis of said first link to reach an over-center position in said clamped position thereby providing high clamping and actuation forces of said rotary clamp without causing excessive wear to said linkage assembly.

7. The over-center rotary power clamp stated in claim 6, wherein said preventing means further comprises:

said first link having an aperture for receiving a pin, wherein said roller is coaxially connected to said pin;

said linkage assembly having a third link pivotally connected to said second link wherein said roller of said first link engages said third link when moving in and out of said clamped position; and a beam structure connected to said housing wherein said pin engages said beam structure in response to said roller of said first link engaging said third link to prohibit said first pivotal axis of said first link from reaching an over-center position.

8. An over-center rotary power clamp as stated in claim 7, further comprising:

means for resisting movement of said roller from said clamped position to said unclamped position when power is lost to said rotary clamp.

9. The over-center rotary power clamp as stated in claim 8, wherein said resisting means comprises:

a spring detent connected to said third link, and said spring detent engaging said roller in said clamped position to resist movement of said roller from moving toward said unclamped position when power is lost to said rotary clamp.

10. The over-center rotary clamp stated in claim 8 wherein said resisting means further comprises:

a spring having its ends connected to said housing and having a mid-portion of said spring engaging said roller in said clamped position to prevent said roller from moving from said clamped position toward said unclamped position when power is lost to said rotary clamp.

11. The over-center rotary power clamp as stated in claim 7, further comprising:

said third link having a substantially inclined surface for engagement with said roller and said inclined surface having a generally upward inclining angle toward said beam structure as said roller moves towards said clamped position; and said beam structure having a substantially flat surface for engaging said pin wherein said flat surface of said beam structure opposes said inclined surface of said third link such that the space between said flat surface and said inclined surface diminishes as said roller and said pin move toward said clamped position thereby prohibiting said first pivotal axis of said first link from reaching an over-center position.

12. The over-center rotary power clamp as stated in claim 11, further comprising:

said inclined surface of said third link having an upwardly angled incline toward said beam structure on both of its ends with a downwardly angled decline away from said beam structure therebetween.

13. An over-center rotary power clamp comprising:

a housing having a linear actuator connected thereto for providing linear actuator motion between a first position and a second position;

a linkage assembly having a first link pivotally connected to said linear actuator, a second link pivotally connected to said first link about a second pivotal axis, and a third link pivotally connected to said second link wherein said linkage assembly converts said linear actuator motion between said first position and said second position into rotary clamp motion between a clamped position and an unclamped position, respectively;

a pin received by an aperture provided in said first link;

a roller pivotally connected to said first link by said pin about a first pivotal axis wherein said first and second pivotal axes are longitudinally spaced, and said roller engaging an inclined surface on said third link when moving in and out of said clamped position; and a beam structure connected to said housing and having a wear surface opposing said inclined surface of said third link wherein said pin engages said wear surface in response to said roller engaging said inclined surface of said third link wherein the distance between said wear surface and said inclined surface of said third link generally diminishes over the entire length of said inclined surface as said roller and said pin approach said clamped position thereby stopping and prohibiting said first pivotal axis of said first link from reaching an over-center position and allowing said second pivotal axis of said first link to reach an over-center position in said clamped position thereby providing high clamping and actuation forces of said rotary clamp without causing excessive wear to said linkage assembly.

14. The over-center rotary power clamp stamp stated in claim 13, further comprising:

said inclined surface of said third link being inclined at both of its ends toward said wear surface of said beam structure and a downwardly angled decline therebetween away from said wear surface of said beam structure.

15. The over-center rotary power clamp stated in claim 13, further comprising:

means for resisting movement of said roller from said clamped position to said unclamped position when power is lost to said rotary clamp.

16. The over-center rotary power clamp stated in claim 15, wherein said resisting means comprises:

a spring detent located on said inclined surface of said third link, and said roller engaging said spring detent in said clamped position to resist movement of said roller from said clamped position to said unclamped position when power is lost to said rotary clamp.

17. The over-center rotary power clamp stated in claim 15 further comprising:

a spring having its end connected to said housing and having a mid-portion engaging said roller in said clamped position to resist said roller from moving toward said unclamped position from said clamped position when power is lost to said rotary clamp.

18. The over-center rotary power clamp stated in claim 16, wherein said spring detent comprises:

a substantially cylindrical open-ended body disposed within said third link;

a compression spring disposed within said body; and a substantially spherical roller partially disposed within said housing wherein said spring engages and biases said spherical roller toward said open end of said housing wherein said spherical roller is captured by said body and extends above said inclined surface of said third link for resisting movement of said roller from said clamped position to said unclamped position.

19. The over center rotary power clamp stated in claim 13, further comprising:

said aperture in said first link for receiving said pin of said roller wherein said aperture is substantially oval to allow said pin to respond to said roller engaging said third link.

* * * * *